(12) United States Patent
Lu et al.

(10) Patent No.: US 10,440,694 B2
(45) Date of Patent: Oct. 8, 2019

(54) MAC CONTROL ELEMENT UPLINK CONFIGURATION METHOD AND DEVICE AND COMMUNICATIONS SYSTEM

(71) Applicant: FUJITSU LIMITED, Kawasaki-shi, Kanagawa (JP)

(72) Inventors: Yanling Lu, Beijing (CN); Lianhai Wu, Beijing (CN); Haibo Xu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 15/630,624

(22) Filed: Jun. 22, 2017

(65) Prior Publication Data

US 2017/0303266 A1 Oct. 19, 2017

Related U.S. Application Data

(63) Continuation of application No. PCT/CN2015/070770, filed on Jan. 15, 2015.

(51) Int. Cl.
*H04W 72/04* (2009.01)
*H04L 12/24* (2006.01)
(Continued)

(52) U.S. Cl.
CPC ..... *H04W 72/0413* (2013.01); *H04L 41/0803* (2013.01); *H04L 61/6022* (2013.01);
(Continued)

(58) Field of Classification Search
CPC ......... H04W 72/0413; H04W 72/1284; H04W 72/04; H04W 24/02; H04L 61/6022; H04L 41/0803
See application file for complete search history.

(56) References Cited

U.S. PATENT DOCUMENTS 8,488,521 B2 7/2013 Wang et al.
9,402,229 B2 7/2016 Wang et al.
(Continued)

FOREIGN PATENT DOCUMENTS

CN 102017726 A 4/2011
CN 102149206 A 8/2011
CN 102264098 A 11/2011

OTHER PUBLICATIONS

International Search Report issued for corresponding International Patent Application No. PCT/CN2015/070770 dated Oct. 22, 2015, with an English translation.

(Continued)

*Primary Examiner* — Walli Z Butt
(74) *Attorney, Agent, or Firm* — Myers Wolin, LLC.

(57) ABSTRACT

An MAC control element (CE) uplink configuration method and device, and communications system, the method includes: when an MAC CE is activated, determining, by user equipment (UE), whether an uplink grant of a serving cell in an authorization frequency band exists; and when the uplink grant of the serving cell in the authorization frequency band exists and can accommodate the MAC CE, allocating, by the UE and for the MAC CE, the uplink grant of the serving cell in the authorization frequency band. An embodiment of the present disclosure improves reliability for transmitting the MAC CE, in an LAA system, and reduces unnecessary latency or failure.

16 Claims, 8 Drawing Sheets

(51) Int. Cl.
*H04L 29/12* (2006.01)
*H04W 72/12* (2009.01)
*H04W 24/02* (2009.01)

(52) U.S. Cl.
CPC ....... *H04W 72/04* (2013.01); *H04W 72/1284* (2013.01); *H04W 24/02* (2013.01)

(56) References Cited

U.S. PATENT DOCUMENTS

| | | |
|---|---|---|
| 9,629,084 B2 | 4/2017 | Wang et al. |
| 2009/0232054 A1 | 9/2009 | Wang et al. |
| 2012/0207040 A1* | 8/2012 | Comsa .............. H04W 72/1215 370/252 |
| 2012/0314672 A1 | 12/2012 | Chen |
| 2013/0265923 A1 | 10/2013 | Wang et al. |
| 2015/0365931 A1* | 12/2015 | Ng ........................ H04L 1/1812 370/329 |
| 2016/0234714 A1* | 8/2016 | Basu Mallick ..... H04W 28/085 |
| 2016/0302154 A1 | 10/2016 | Wang et al. |
| 2016/0337867 A1* | 11/2016 | Uchino ................. H04W 16/14 |

OTHER PUBLICATIONS

Written Opinion of the International Searching Authority issued for corresponding International Patent Application No. PCT/CN2015/070770 dated Oct. 22, 2015, with an English translation.

First Notification of Office Action and Search Report issued by the China National Intellectual Property Administration for corresponding Chinese Patent Application No. 201580065287.9, dated Mar. 19, 2019, with an English translation.

\* cited by examiner

MAC CONTROL ELEMENT UPLINK CONFIGURATION METHOD AND DEVICE AND COMMUNICATIONS SYSTEM

CROSS REFERENCE TO RELATED APPLICATIONS

This application is a continuation application of International Application PCT/CN2015/070770 filed on Jan. 15, 2015, the entire contents of which are incorporated herein by reference.

TECHNICAL FIELD

This disclosure relates to the field of communications technologies, and in particular to a medium access control (MAC) control element (CE) uplink configuration method and device and a communications system.

BACKGROUND

In a long-term evolution-advanced (LTE-A) carrier aggregation (CA) system, multiple carriers are aggregated, and may communicate with a single piece of user equipment (UE, which may also be referred to as a terminal or terminal equipment) at the same time. That is, one piece of UE has multiple serving cells. In the multiple serving cells, one is a primary cell (PCell), and others are secondary cells (SCells).

Meanwhile, in multiple processes of the LTE-A CA system, there are different MAC CEs which control the UE or are used for transmission various information, such as a discontinuous reception (DRX) control process, an uplink time adjustment process, a power headroom report and a buffer status report (BSR), etc. Such processes are necessary for normal operation of the LTE-A CA system, and the MAC CEs are signaling indispensable to control of these processes. Therefore, in a process of logic channel prioritization (LCP) in the LTE-A CA system, priorities of different MAC CEs and data of different logic channel are (in a descending order):

cell radio network temporary identifier (C-RNTI) MAC CEs or data transmitted on uplink common control channels (UL-CCCHs);

MAC CEs for BSR with exception of BSR included for padding;

MAC CEs for a power headroom report (PHR) or an extended PHR;

data transmitted on any logic channels with exception of UL-CCCHs; and

MAC CEs for BSR included for padding.

It can be seen from the above order of priorities that UE data (data included in "data transmitted on any logic channels with exception of UL-CCCHs") have secondarily lowest priorities, while priorities of most of the MAC CEs (with exception of MAC CEs for BSR included for padding) are higher than those of the UE data.

Hence, in a current LTE-A system, when UE receives uplink grants allocated for one or more cells in a transmission time interval (TTI), as these cells are all in a licensed band, the UE will deem that channel quality of these cells is similar, not differentiate these cells, and select appropriate cells for different MAC CEs or data after selecting the MAC CEs or data according to the principle of descending order of priorities, and transmit the MAC CEs or data on the selected cells.

In selecting cells for different MAC CEs or data, the UE may obey a manner of implementation of itself, and no principle or method for selecting cells is provided in the current protocols.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that in a licensed-band assistant access (LAA) system, during an LCP process of an MAC layer, it is possible that MAC CEs of higher priorities are actually transmitted by serving cells in an unlicensed band if a current transmission method is followed in which cells are not differentiated. Hence, reliabilities of the transmitted MAC CEs are not high, and a lot of unnecessary latency even transmission failures may occur.

Embodiments of this disclosure provide an MAC control element uplink configuration method and device and a communications system; in an LAA system, reliable and timely transmission of MAC control elements is ensured as possible.

According to a first aspect of the embodiments of this disclosure, there is provided an MAC control element uplink configuration method, including:

determining, by UE, whether there exists an uplink grant of a serving cell in a licensed band when an MAC control element is triggered; and allocating, by the UE, the uplink grant of the serving cell in the licensed band for the MAC control element in a case where there exists the uplink grant of the serving cell in the licensed band and the uplink grant of the serving cell in the licensed band is capable of accommodating the MAC control element.

According to a second aspect of the embodiments of this disclosure, there is provided an MAC control element uplink configuration device, including:

a determining unit configured to determine whether there exists an uplink grant of a serving cell in a licensed band when an MAC control element is triggered; and a configuring unit configured to allocate the uplink grant of the serving cell in the licensed band for the MAC control element in a case where there exists the uplink grant of the serving cell in the licensed band and the uplink grant of the serving cell in the licensed band is capable of accommodating the MAC control element.

According to a third aspect of the embodiments of this disclosure, there is provided a communications system, including:

UE configured to determine whether there exists an uplink grant of a serving cell in a licensed band when an MAC control element is triggered, and allocate the uplink grant of the serving cell in the licensed band for the MAC control element in a case where there exists the uplink grant of the serving cell in the licensed band and the uplink grant of the serving cell in the licensed band is capable of accommodating the MAC control element.

According to another aspect of the embodiments of this disclosure, there is provided a computer readable program code, which, when executed in UE, will cause a computer unit to carry out the MAC control element uplink configuration method as described above in the UE.

According to a further aspect of the embodiments of this disclosure, there is provided a computer readable medium, including a computer readable program code, which will cause a computer unit to carry out the MAC control element uplink configuration method as described above in UE.

An advantage of the embodiments of this disclosure exists in that the UE determines whether there exists the uplink grant of the serving cell in the licensed band when the MAC control element is triggered, and preferentially allocates the MAC control element for the uplink grant of the serving cell in the licensed band in the case where there exists the uplink grant of the serving cell in the licensed band. Hence, reliability of transmitting the MAC control element in the LAA system may be improved, and unnecessary transmission latency or failure may be lowered.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In a current LTE-A system, all serving cells are in licensed bands. In other words, if these frequencies are used by the LTE-A, authorization from a government or a related mechanism needs to be obtained. However, in many countries in the world, there are some unlicensed bands, such as 5 GHz band in China. These unlicensed bands are widely used, which may be used in a radio access system, an intelligent transportation wireless communications system, and a point to point or point to multipoint communications system, etc. The unlicensed bands may be used by anyone by using equipment satisfying specified requirements, with no need of authorization.

On the other hand, as increasing richness of radio traffics, radio data traffics increase rapidly, and loads of existing licensed bands are more and more heavy, and use of unlicensed bands is means for overcoming shortage of frequencies. The LAA system is a wireless system which extends an existing LTE-A CA system and carries data by using unlicensed bands with assistance of licensed bands.

In particular, in the LAA system, the UE has a primary cell or zero or one or more secondary cells in a licensed band (a serving cell in the licensed band is hereinafter referred to as an L_Cell), and one or more secondary cells in an unlicensed band (a serving cell in the unlicensed band is hereinafter referred to as a U_Cell). Thus, data of some traffics may be transmitted in U_Cell(s), and a function of expanding throughput of the UE may be achieved.

However, as many systems operate in the unlicensed band and the systems are independent of each other, carrier interference in this band is relatively severe, which is bursty and uneasy to be controlled. Although there exist corresponding governmental or mechanism supervision or permission policies for equipment using unlicensed bands, such as requiring that the equipment has a dynamic frequency selection (DFS) or listen before talk (LBT) function to avoid interference, carriers in the unlicensed bands and carriers in the licensed bands having the same reliabilities can still not be ensured.

In the LAA system, in an LCP process of an MAC layer, if a current transmission method is followed in which cells are not differentiated, it is possible that MAC CEs of higher priorities are actually transmitted by the U_Cell, and it is usual that reliabilities of the carriers in the unlicensed bands are not high. Hence, it is possible that the transmitted MAC CEs can be correctly received by a base station only after multiple times of hybrid automatic repeat requests (HARQs), or even fails in the transmission. Therefore, how to ensure that MAC CEs can be reliably and timely transmitted to a base station is a problem needing to be solved.

Embodiment 1

Figure 1:
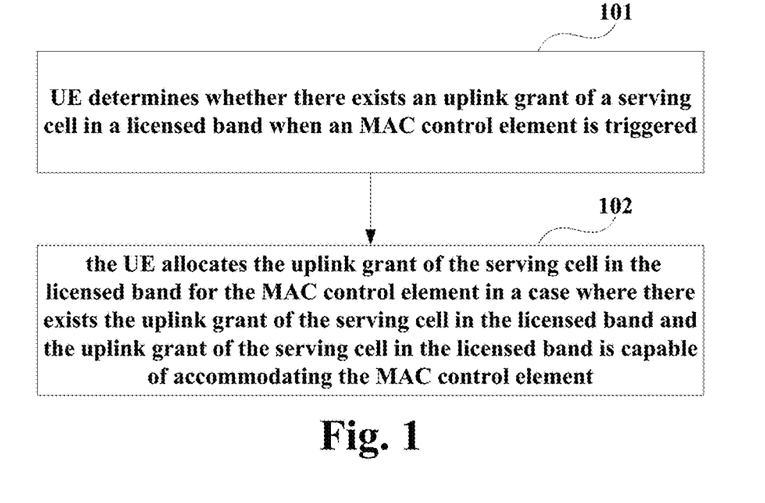
FIG. 1 is a flowchart of an uplink configuration method of an embodiment of this disclosure.

An embodiment of this disclosure provides an MAC control element uplink configuration method, applicable to a UE side. FIG. 1 is a flowchart of the uplink configuration method of the embodiment of this disclosure. As shown in FIG. 1, the method includes:

step 101: UE determines whether there exists an uplink grant of a serving cell in a licensed band when an MAC control element is triggered; and step 102: the UE allocates the uplink grant of the serving cell in the licensed band for the MAC control element in a case where there exists the uplink grant of the serving cell in the licensed band and the uplink grant of the serving cell in the licensed band is capable of accommodating the MAC control element.

In this embodiment, the MAC control element may include: an MAC control element for a BSR with exception of BSRs included for padding, and/or an MAC control element for a PHR or an extended PHR. That is, as described above, the MAC CEs may be divided into four grades in the LCP process, which are (in a descending order):

(1) C-RNTI MAC CEs;
(2) MAC CEs for BSR with exception of BSR included for padding;
(3) MAC CEs for a PHR or an extended PHR; and
(4) MAC CEs for BSR included for padding.

For example, the C-RNTI MAC CEs are mainly used for an access process of the UE, and are only transmitted in a PCell/PCells, which may not be taken into account in this disclosure. And the MAC CEs for BSR included for padding may also not be taken into account in this disclosure, as their priorities are the lowest among all the MAC CEs and data. (2) MAC CEs for BSR with exception of BSR included for padding and (3) MAC CEs for a PHR or an extended PHR are taken into account in this disclosure. However, this disclosure is not limited thereto; for example, for (1) C-RNTI MAC CEs, the method of this disclosure is also applicable.

In this embodiment, if there exists an uplink grant of the L_Cell and the uplink grant is capable of accommodating the triggered MAC CE, the uplink grant of the L_Cell may be allocated for the MAC CE. Hence, the MAC CE may be transmitted via the L_Cell, and reliability of transmission of the MAC CE may be improved.

In an implementation, if there exists no the uplink grant of the L_Cell in the system after MAC CEs and data of priorities higher than that of the MAC CE are allocated with the uplink grant, the transmission of the MAC CE will not be taken into account in the LCP process. That is, in such a case, even though the MAC CE is triggered, it will not be allocated with the uplink grant within the current TTI. The MAC CE is transmitted until after there exists the uplink grant of the L_Cell, or the MAC CE is cancelled within a subsequent TTI.

Figure 2:
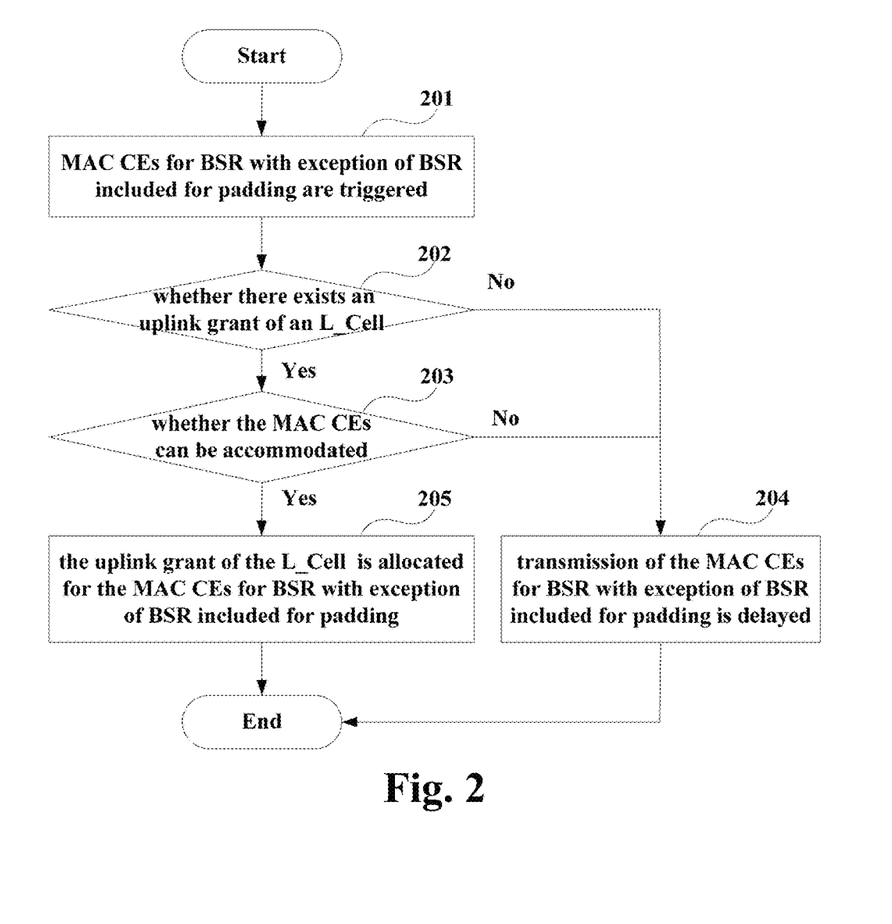
FIG. 2 is another flowchart of the uplink configuration method of the embodiment of this disclosure.

FIG. 2 is another flowchart of the uplink configuration method of the embodiment of this disclosure, in which a case of the MAC CE for BSR with exception of BSR included for padding is shown. As shown in FIG. 2, the method includes:

step 201: MAC CEs for BSR with exception of BSR included for padding are triggered;

in this embodiment, the triggering of all MAC CEs needing to be allocated with the uplink grant within the current TTI occurs prior to allocating the uplink grant for the MAC CEs;

step 202: it is determined whether there exists an uplink grant of an L_Cell;

in this embodiment, after allocating the uplink grant for the MAC CEs or data of priorities higher than those of the MAC CEs for BSR with exception of BSR included for padding, the UE determines whether there exists the uplink grant of the L_Cell;

if there exists the uplink grant of the L_Cell, step 203 is executed, and if there exists no the uplink grant of the L_Cell, step 204 is executed;

step 203: it is determined whether the uplink grant of the L_Cell is capable of accommodating the MAC CE;

if the MAC CE may be accommodated, step 205 is executed, and if the MAC CE may not be accommodated, step 204 is executed;

in particular implementation, steps 202 and 203 may be executed in a combined manner, that is, judging whether there exists the uplink grant of the L_Cell and whether the uplink grant of the L_Cell is capable of accommodating the MAC CE, and if the conditions are satisfied, step 205 is executed, and if the conditions are not satisfied, step 204 is executed;

step 204: transmission of the MAC CEs for BSR with exception of BSR included for padding is delayed;

in this implementation, a particular meaning of the delayed transmission may refer to that although the MAC CEs for BSR with exception of BSR included for padding are triggered, they will not be allocated with the uplink grant within this TTI, and will not be cancelled; these MAC CEs may be transmitted or cancelled within a subsequent TTI, and other MAC CEs of priorities lower than those of the MAC CEs for BSR with exception of BSR included for padding are still possible be allocated with the uplink grant within this TTI in a remaining LCP process; in the embodiment of this disclosure, a particular meaning of delayed transmission of an MAC CE is similar to what is described above, and shall not be described later;

step 205: the uplink grant of the L_Cell is allocated for the MAC CEs for BSR with exception of BSR included for padding.

After step 204 or 205, the UE may proceed with allocating the uplink grant for MAC CEs or data of lower priorities. After being allocated with the uplink grant of the L_Cell, the MAC CEs for BSR with exception of BSR included for padding may be transmitted at an appropriate time.

Figure 3:
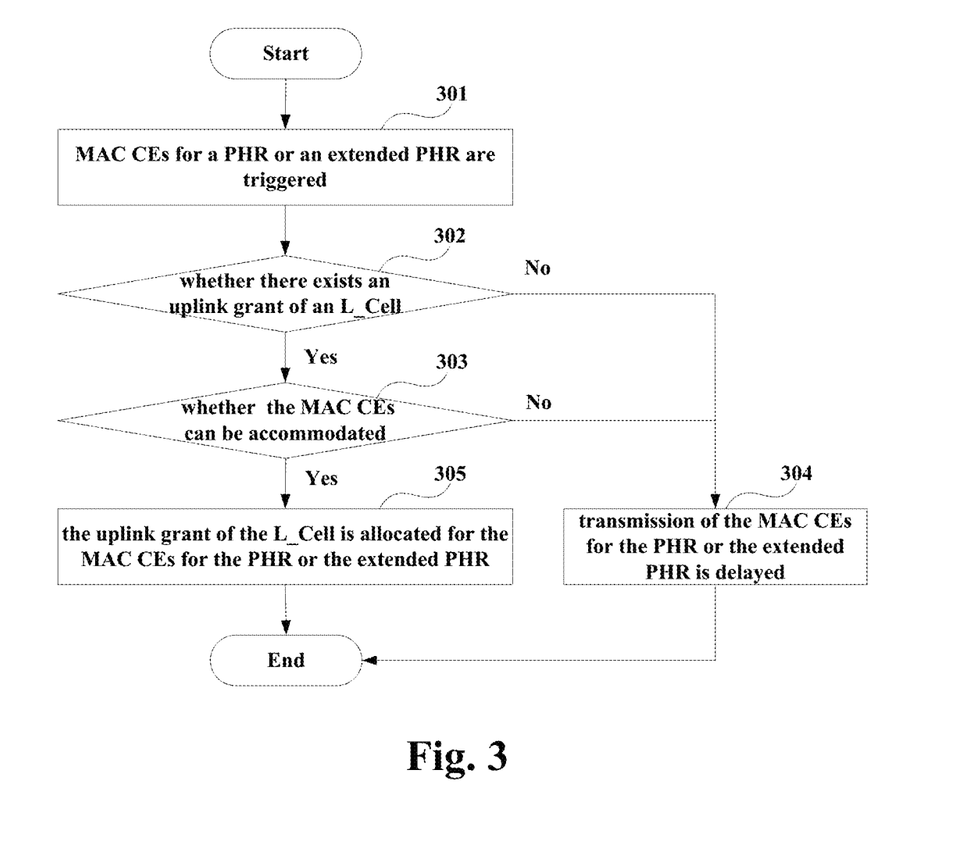
FIG. 3 is a further flowchart of the uplink configuration method of the embodiment of this disclosure.

FIG. 3 is a further flowchart of the uplink configuration method of the embodiment of this disclosure, in which a case of the MAC CEs for a PHR or an extended PHR is shown. As shown in FIG. 3, the method includes:

step 301: MAC CEs for a PHR or an extended PHR are triggered;

step 302: it is determined whether there exists an uplink grant of an L_Cell;

in this embodiment, after allocating the uplink grant for the MAC CEs or data of priorities higher than those of the MAC CEs for a PHR or an extended PHR, the UE determines whether there exists the uplink grant of the L_Cell;

if there exists the uplink grant of the L_Cell, step 303 is executed, and if there exists no the uplink grant of the L_Cell, step 304 is executed;

step 303: it is determined whether the uplink grant of the L_Cell is capable of accommodating the MAC CE;

if the MAC CE may be accommodated, step 305 is executed, and if the MAC CE may not be accommodated, step 304 is executed;

in particular implementation, steps 302 and 303 may be executed in a combined manner, that is, judging whether there exists the uplink grant of the L_Cell and whether the uplink grant of the L_Cell is capable of accommodating the MAC CE, and if the conditions are satisfied, step 305 is executed, and if the conditions are not satisfied, step 304 is executed;

step 304: transmission of the MAC CEs for the PHR or the extended PHR is delayed;

in this implementation, the UE does not take allocating the uplink grant for the MAC CEs for a PHR or an extended PHR into account within this TTI any longer; however, other MAC CEs of priorities lower than those of the MAC CEs for a PHR or an extended PHR may still be allocated with the uplink grant via remaining LCP process within this TTI;

step 305: the uplink grant of the L_Cell is allocated for the MAC CEs for the PHR or the extended PHR.

After step 304 or 305, the UE may proceed with allocating the uplink grant for MAC CEs or data of lower priorities. After being allocated with the uplink grant of the L_Cell, the MAC CEs for a PHR or an extended PHR may be transmitted at an appropriate time.

Figure 4:
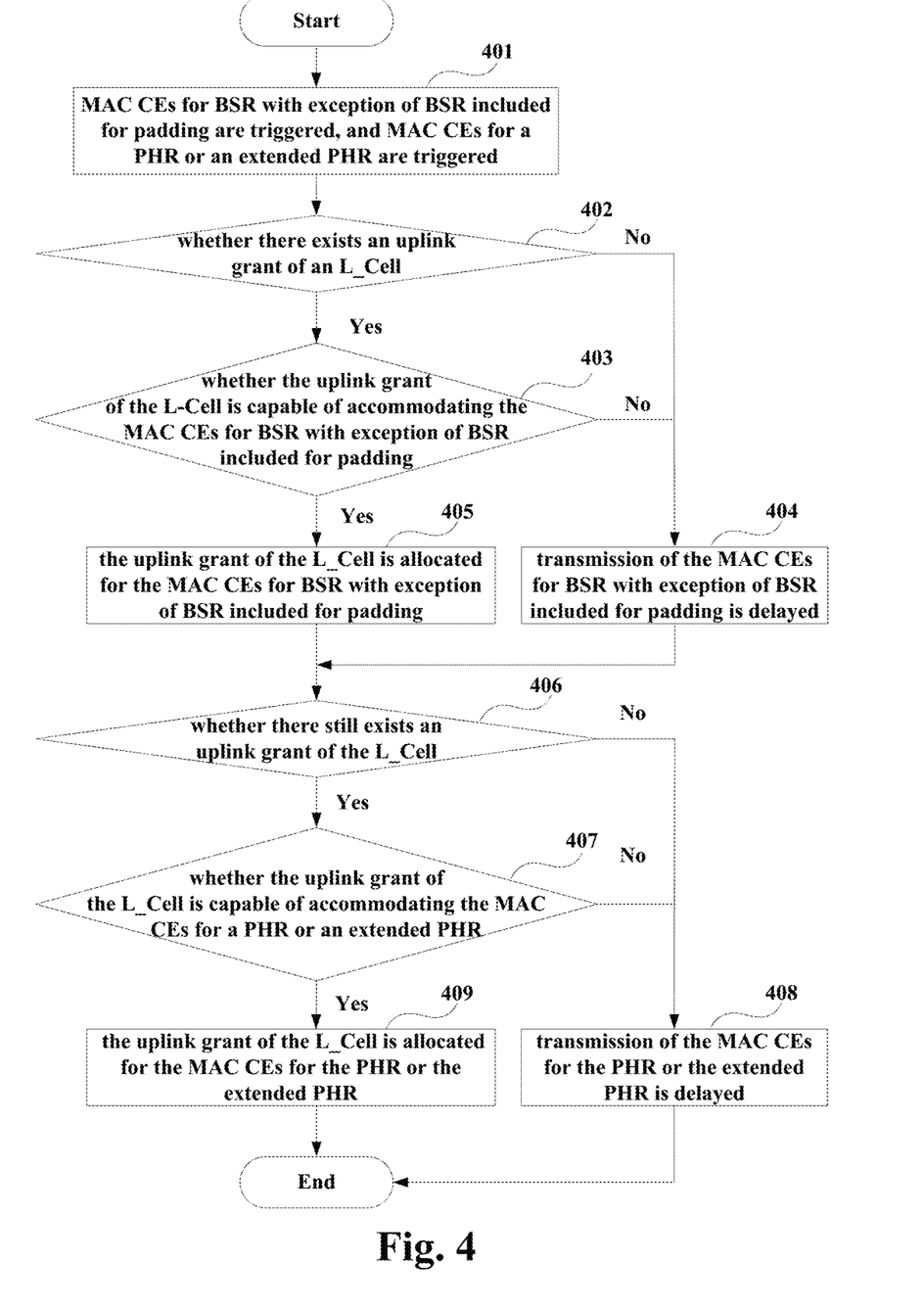
FIG. 4 is still another flowchart of the uplink configuration method of the embodiment of this disclosure.

FIG. 4 is still another flowchart of the uplink configuration method of the embodiment of this disclosure, in which a case of the MAC CEs for BSR with exception of BSR included for padding and the MAC CEs for a PHR or an extended PHR is shown. As shown in FIG. 4, the method includes:

step 401: the MAC CEs for BSR with exception of BSR included for padding are triggered, and the MAC CEs for a PHR or an extended PHR are triggered;

step 402: it is determined whether there exists an uplink grant of an L_Cell;

if there exists the uplink grant of the L_Cell, step 403 is executed, and if there exists no the uplink grant of the L_Cell, step 404 is executed;

step 403: it is determined whether the uplink grant of the L_Cell is capable of accommodating the MAC CEs for BSR with exception of BSR included for padding;

if the MAC CEs may be accommodated, step 405 is executed, and if the MAC CEs may not be accommodated, step 404 is executed;

in particular operation, steps 402 and 403 may be executed in a combined manner, that is, judging whether there exists the uplink grant of the L_Cell and whether the uplink grant of the L_Cell is capable of accommodating the MAC CEs for BSR with exception of BSR included for padding, and if it is determined yes, step 405 is executed, and if it is determined no, step 404 is entered;

step 404: transmission of the MAC CEs for BSR with exception of BSR included for padding is delayed;

step 405: the uplink grant of the L_Cell is allocated for the MAC CEs for BSR with exception of BSR included for padding;

step 406: it is determined whether there still exists an uplink grant of the L_Cell;

if there still exists the uplink grant of the L_Cell, step 407 is executed, and if there exists no the uplink grant of the L_Cell, step 408 is executed;

step 407: it is determined whether the uplink grant of the L_Cell is capable of accommodating the MAC CEs for a PHR or an extended PHR;

if the MAC CEs may be accommodated, step 409 is executed, and if the MAC CEs may not be accommodated, step 408 is executed;

in particular operation, steps 406 and 407 may be executed in a combined manner, that is, judging whether there exists the uplink grant of the L_Cell and whether the uplink grant of the L_Cell is capable of accommodating the MAC CEs for a PHR or an extended PHR, and if it is determined yes, step 409 is executed, and if it is determined no, step 408 is entered;

step 408: transmission of the MAC CEs for the PHR or the extended PHR is delayed; and step 409: the uplink grant of the L_Cell is allocated for the MAC CEs for the PHR or the extended PHR.

After step 408 or 409, the UE may proceed with allocating the uplink grant for MAC CEs or data of lower priorities via a remaining LCP process. After being allocated with the uplink grant of the L_Cell, the MAC CEs for BSR with exception of BSR included for padding and the MAC CEs for a PHR or an extended PHR may be transmitted at an appropriate time.

In another implementation, if the MAC CEs for BSR with exception of BSR included for padding and/or the MAC CEs for a PHR or an extended PHR are triggered, in the LCP process, whether there exists an uplink grant of an L_Cell is determined. If there exists no the uplink grant of the L_Cell but there exists uplink grant of a U_Cell, the uplink grant of the U_Cell may be allocated for the MAC CEs in the LCP process; and if there exists the uplink grant of the L_Cell, the MAC CEs shall be transmitted in the U_Cell only.

Figure 5:
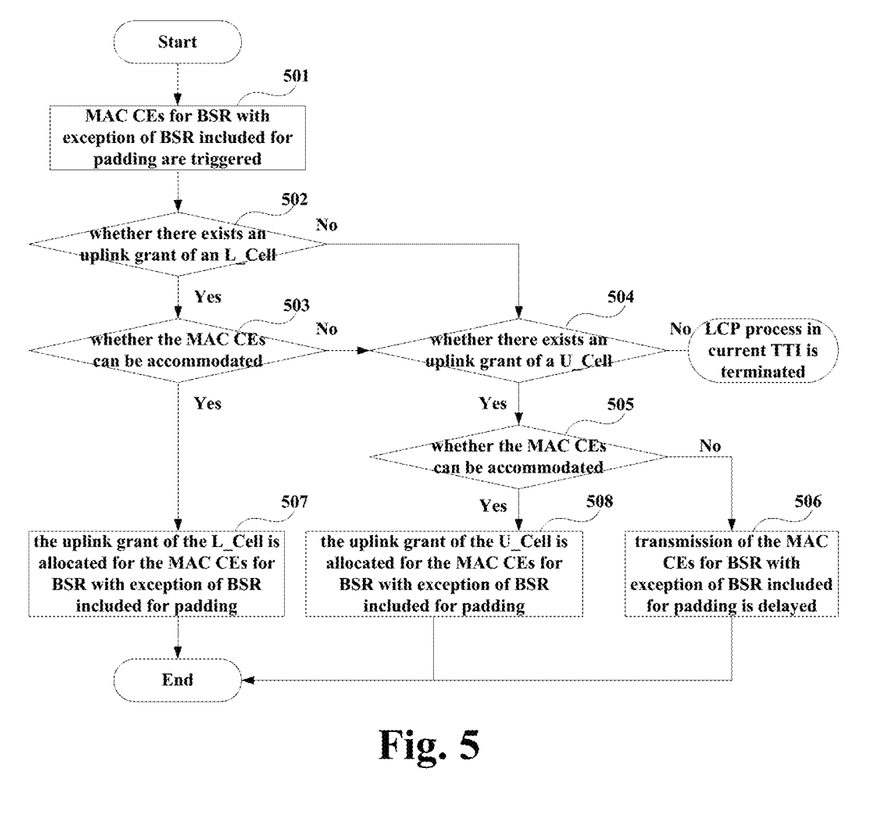
FIG. 5 is further still another flowchart of the uplink configuration method of the embodiment of this disclosure.

FIG. 5 is further still another flowchart of the uplink configuration method of the embodiment of this disclosure, in which a case of the MAC CEs for BSR with exception of BSR included for padding is shown. As shown in FIG. 5, the method includes:

step 501: MAC CEs for BSR with exception of BSR included for padding are triggered;

step 502: it is determined whether there exists an uplink grant of an L_Cell;

in this embodiment, after allocating the uplink grant for the MAC CEs or data of priorities higher than those of the MAC CEs for BSR with exception of BSR included for padding, the UE determines whether there exists the uplink grant of the L_Cell;

if there exists the uplink grant of the L_Cell, step 503 is executed, and if there exists no the uplink grant of the L_Cell, step 504 is executed;

step 503: it is determined whether the uplink grant of the L_Cell is capable of accommodating the MAC CEs for BSR with exception of BSR included for padding;

if the MAC CEs may be accommodated, step 507 is executed, and if the MAC CEs may not be accommodated, step 504 is executed;

in particular operation, steps 502 and 503 may be executed in a combined manner, that is, judging whether there exists the uplink grant of the L_Cell and whether the uplink grant of the L_Cell is capable of accommodating the MAC CEs for BSR with exception of BSR included for padding, and if it is determined yes, step 507 is executed, and if it is determined no, step 504 is executed;

step 504: it is determined whether there exists an uplink grant of a U_Cell;

if there exists the uplink grant of the U_Cell, step 505 is executed, and if there exists no the uplink grant of the U_Cell, the LCP process within this TTI is terminated; that is, the MAC CEs for BSR with exception of BSR included for padding and MAC CEs or UE data of priorities lower than those of the MAC CEs for BSR with exception of BSR included for padding may not obtain the uplink grant within this TTI, and the LCP process within this TTI is terminated at this moment;

step 505: it is determined whether the uplink grant of the U_Cell is capable of accommodating the MAC CEs;

if the MAC CEs may be accommodated, step 508 is executed, and if the MAC CEs may not be accommodated, step 506 is executed;

step 506: transmission of the MAC CEs for BSR with exception of BSR included for padding is delayed;

in this implementation, the UE does not take transmitting the MAC CEs for BSR with exception of BSR included for padding into account any longer; and a particular meaning of the delayed transmission may refer to that although the MAC CEs for BSR with exception of BSR included for padding are triggered, they will not be allocated with the uplink grant within this TTI, and will not be cancelled; these MAC CEs may be transmitted or cancelled within a subsequent TTI, and other MAC CEs of priorities lower than those of the MAC CEs for BSR with exception of BSR included for padding are still possible be allocated with the uplink grant within this TTI in a remaining LCP process;

step 507: the uplink grant of the L_Cell is allocated for the MAC CEs for BSR with exception of BSR included for padding; and step 508: the uplink grant of the U_Cell is allocated for the MAC CEs for BSR with exception of BSR included for padding.

After step 506, 507 or 508, the UE may proceed with allocating the uplink grant for MAC CEs or data of lower priorities. After being allocated with the uplink grant of the L_Cell or the U_Cell, the MAC CEs for BSR with exception of BSR included for padding may be transmitted at an appropriate time.

Figure 6:
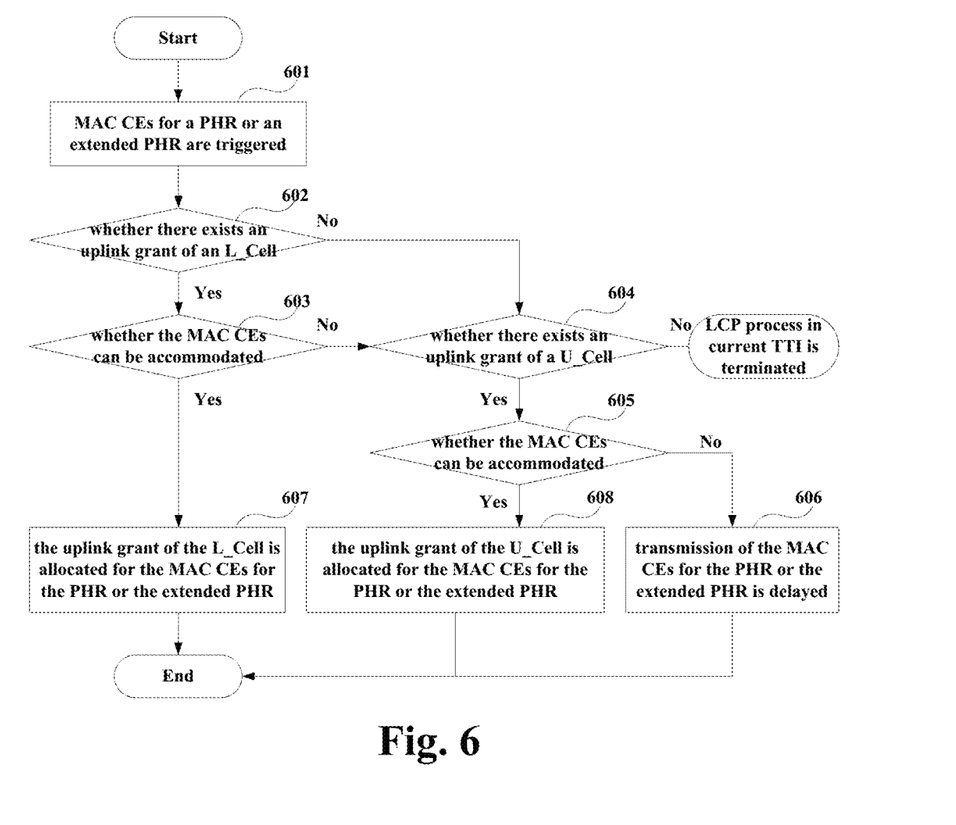
FIG. 6 is yet still another flowchart of the uplink configuration method of the embodiment of this disclosure.

FIG. 6 is yet still another flowchart of the uplink configuration method of the embodiment of this disclosure in which a case of the MAC CEs for a PHR or an extended PHR is shown. As shown in FIG. 6, the method includes:

step 601: MAC CEs for a PHR or an extended PHR are triggered;

step 602: it is determined whether there exists an uplink grant of an L_Cell;

in this embodiment, after allocating the uplink grant for the MAC CEs or data of priorities higher than those of the MAC CEs for a PHR or an extended PHR, the UE determines whether there exists the uplink grant of the L_Cell;

if there exists the uplink grant of the L_Cell, step 603 is executed, and if there exists no the uplink grant of the L_Cell, step 604 is executed;

step 603: it is determined whether the uplink grant of the L_Cell is capable of accommodating the MAC CEs for a PHR or an extended PHR;

if the MAC CEs may be accommodated, step 607 is executed, and if the MAC CEs may not be accommodated, step 604 is executed;

in particular implementation, steps 602 and 603 may be executed in a combined manner, that is, judging whether there exists the uplink grant of the L_Cell and whether the uplink grant of the L_Cell is capable of accommodating the MAC CEs for a PHR or an extended PHR, and if it is determined yes, step 607 is executed, and if t is determined no, step 604 is executed;

step 604: it is determined whether there exists an uplink grant of a U_Cell;

if there exists the uplink grant of the U_Cell, step 605 is executed, and if there exists no the uplink grant of the U_Cell, the LCP process within this TTI is terminated; that is, the MAC CEs for a PHR or an extended PHR and MAC CEs or UE data of priorities lower than those of the MAC CEs for a PHR or an extended PHR may not obtain the uplink grant within this TTI, and the LCP process within this TTI is terminated at this moment;

step 605: it is determined whether the uplink grant of the U_Cell is capable of accommodating the MAC CEs;

if the MAC CEs may be accommodated, step 608 is executed, and if the MAC CEs may not be accommodated, step 606 is executed;

step 606: transmission of the MAC CEs for the PHR or the extended PHR is delayed, that is, no the uplink grant is allocated for the MAC CEs for a PHR or an extended PHR within the current TTI;

step 607: the uplink grant of the L_Cell is allocated for the MAC CEs for the PHR or the extended PHR; and step 608: the uplink grant of the U_Cell is allocated for the MAC CEs for the PHR or the extended PHR.

After step 606, 607 or 608, the UE may proceed with allocating the uplink grant for MAC CEs or data of lower priorities. After being allocated with the uplink grant of the L_Cell or the U_Cell, the MAC CEs for a PHR or an extended PHR may be transmitted at an appropriate time.

Figure 7:
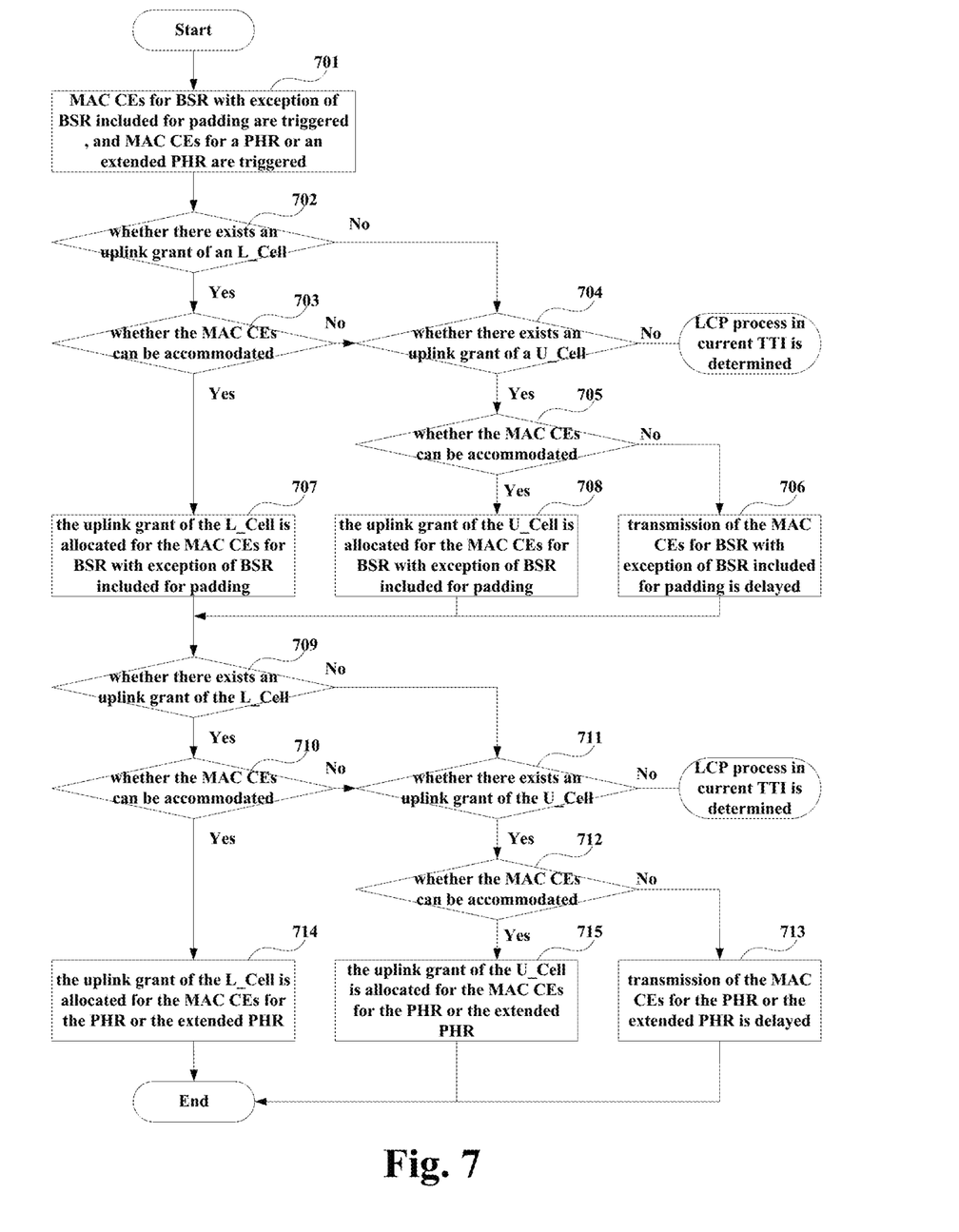
FIG. 7 is even still another flowchart of the uplink configuration method of the embodiment of this disclosure.

FIG. 7 is even still another flowchart of the uplink configuration method of the embodiment of this disclosure, in which a case of the MAC CEs for BSR with exception of BSR included for padding and the MAC CEs for a PHR or an extended PHR is shown. As shown in FIG. 7, the method includes:

step 701: MAC CEs for BSR with exception of BSR included for padding are triggered, and MAC CEs for a PHR or an extended PHR are triggered;

step 702: it is determined whether there exists an uplink grant of an L_Cell;

if there exists the uplink grant of the L_Cell, step 703 is executed, and if there exists no the uplink grant of the L_Cell, step 704 is executed;

step 703: it is determined whether the uplink grant of the L_Cell is capable of accommodating the MAC CEs for BSR with exception of BSR included for padding;

if the MAC CEs may be accommodated, step 707 is executed, and if the MAC CEs may not be accommodated, step 704 is executed;

in particular operation, steps 702 and 703 may be executed in a combined manner, that is, judging whether there exists the uplink grant of the L_Cell and whether the uplink grant of the L_Cell is capable of accommodating the MAC CEs for BSR with exception of BSR included for padding, and if it is determined yes, step 707 is executed, and if it is determined no, step 704 is executed;

step 704: it is determined whether there exists an uplink grant of a U_Cell;

if there exists the uplink grant of the U_Cell, step 705 is executed, and if there exists no the uplink grant of the U_Cell, the LCP process within this TTI is terminated; that is, the MAC CEs for BSR with exception of BSR included for padding and MAC CEs or UE data of priorities lower than those of the MAC CEs for BSR with exception of BSR included for padding may not obtain the uplink grant within this TTI, and the LCP process within this TTI is terminated at this moment;

step 705: it is determined whether the uplink grant of the U_Cell is capable of accommodating the MAC CEs for BSR with exception of BSR included for padding;

if the MAC CEs may be accommodated, step 708 is executed, and if the MAC CEs may not be accommodated, step 706 is executed;

step 706: transmission of the MAC CEs for BSR with exception of BSR included for padding is delayed;

step 707: the uplink grant of the L_Cell is allocated for the MAC CEs for BSR with exception of BSR included for padding;

step 708: the uplink grant of the U_Cell is allocated for the MAC CEs for BSR with exception of BSR included for padding;

step 709: it is determined whether there still exists an uplink grant of the L_Cell;

if there still exists the uplink grant of the L_Cell, step 710 is executed, and if there exists no the uplink grant of the L_Cell, step 711 is executed;

step 710: it is determined whether the uplink grant of the L_Cell is capable of accommodating the MAC CEs for a PHR or an extended PHR;

if the MAC CEs may be accommodated, step 714 is executed, and if the MAC CEs may not be accommodated, step 711 is executed;

in particular operation, steps 709 and 710 may be executed in a combined manner, that is, judging whether there exists the uplink grant of the L_Cell and whether the uplink grant of the L_Cell is capable of accommodating the MAC CEs for a PHR or an extended PHR, and if it is determined yes, step 714 is executed, and if it is determined no, step 711 is executed;

step 711: it is determined whether there still exists an uplink grant of the U_Cell;

if there exists the uplink grant of the U_Cell, step 712 is executed, and if there exists no the uplink grant of the U_Cell, the LCP process within this TTI is terminated; that is, the MAC CEs for a PHR or an extended PHR and MAC CEs or UE data of priorities lower than those of the MAC CEs for a PHR or an extended PHR may not obtain the uplink grant within this TTI, and the LCP process within this TTI is terminated at this moment;

step 712: it is determined whether the uplink grant of the U_Cell is capable of accommodating the MAC CEs for a PHR or an extended PHR;

if the MAC CEs may be accommodated, step 715 is executed, and if the MAC CEs may not be accommodated, step 715 is executed;

step 713: transmission of the MAC CEs for the PHR or the extended PHR is delayed;

step 714: the uplink grant of the L_Cell is allocated for the MAC CEs for the PHR or the extended PHR; and step 715: the uplink grant of the U_Cell is allocated for the MAC CEs for the PHR or the extended PHR.

After step 713, 714 or 715, the UE may proceed with allocating the uplink grant for MAC CEs or data of lower priorities. After being allocated with the uplink grant of the L_Cell or the U_Cell, the MAC CEs for BSR with exception of BSR included for padding and the MAC CEs for a PHR or an extended PHR may be transmitted at an appropriate time.

It can be seen from the above embodiment that the UE determines whether there exists the uplink grant of the serving cell in the licensed band when the MAC control element is triggered, and preferentially allocates the MAC control element for the uplink grant of the serving cell in the licensed band in the case where there exists the uplink grant of the serving cell in the licensed band. Hence, reliability of transmitting the MAC control element in the LAA system may be improved, and unnecessary transmission latency or failure may be lowered.

Embodiment 2

An embodiment of this disclosure provides an MAC control element uplink configuration device, configured in UE side. The embodiment of this disclosure corresponds to the uplink configuration method in Embodiment 1, with identical contents being not going to be described herein any further.

Figure 8:
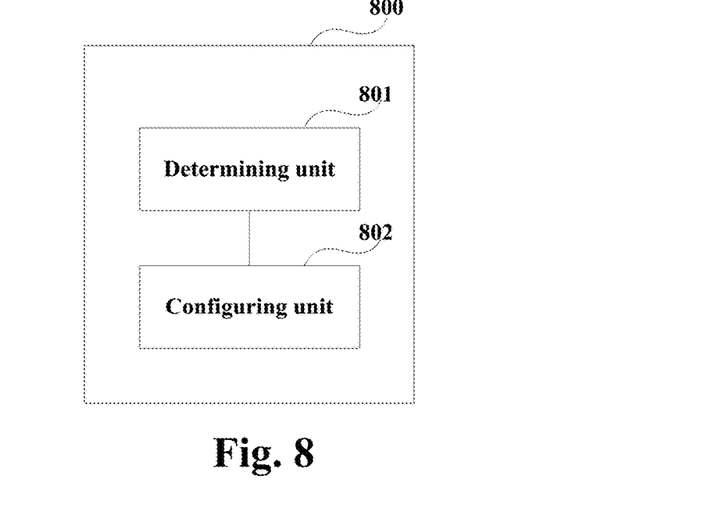
FIG. 8 is a schematic diagram of an uplink configuration device of an embodiment of this disclosure.

FIG. 8 is a schematic diagram of the uplink configuration device of the embodiment of this disclosure. As shown in FIG. 8, MAC control element uplink configuration device 800 includes:

a determining unit 801 configured to determine whether there exists an uplink grant of a serving cell in a licensed band when an MAC control element is triggered; and a configuring unit 802 configured to allocate the uplink grant of the serving cell in the licensed band for the MAC control element in a case where there exists the uplink grant of the serving cell in the licensed band and the uplink grant of the serving cell in the licensed band is capable of accommodating the MAC control element.

For example, the MAC control element may include: an MAC control element for a BSR with exception of BSRs included for padding, and/or an MAC control element for a PHR or an extended PHR.

In this embodiment, the configuring unit 802 may be further configured to: delay transmission of the MAC control element in a case where the uplink grant of the serving cell in the licensed band is incapable of accommodating the MAC control element.—

In an implementation, the configuring unit 802 may be further configured to: delay transmission of the MAC control element in a case where there exists no the uplink grant of the serving cell in the licensed band.

In another implementation, the determining unit 801 may be further configured to: determine whether there exists an uplink grant of a serving cell in an unlicensed band in a case where there exists no the uplink grant of the serving cell in the licensed band; and the configuring unit 802 may be further configured to: allocate the uplink grant of the serving cell in the unlicensed band for the MAC control element in a case where there exists the uplink grant of the serving cell in the unlicensed band and the uplink grant of the serving cell in the unlicensed band is capable of accommodating the MAC control element.

Furthermore, the configuring unit 802 may be further configured to: delay transmission of the MAC control element in a case where the uplink grant of the serving cell in the unlicensed band is incapable of accommodating the MAC control element. And the configuring unit 802 mat be further configured to: terminate a process of logical channel prioritization in a case where there exists no the uplink grant of the serving cell in the unlicensed band.

The embodiment of this disclosure further provides UE, configured with the MAC control element uplink configuration device 800 described above.

Figure 9:
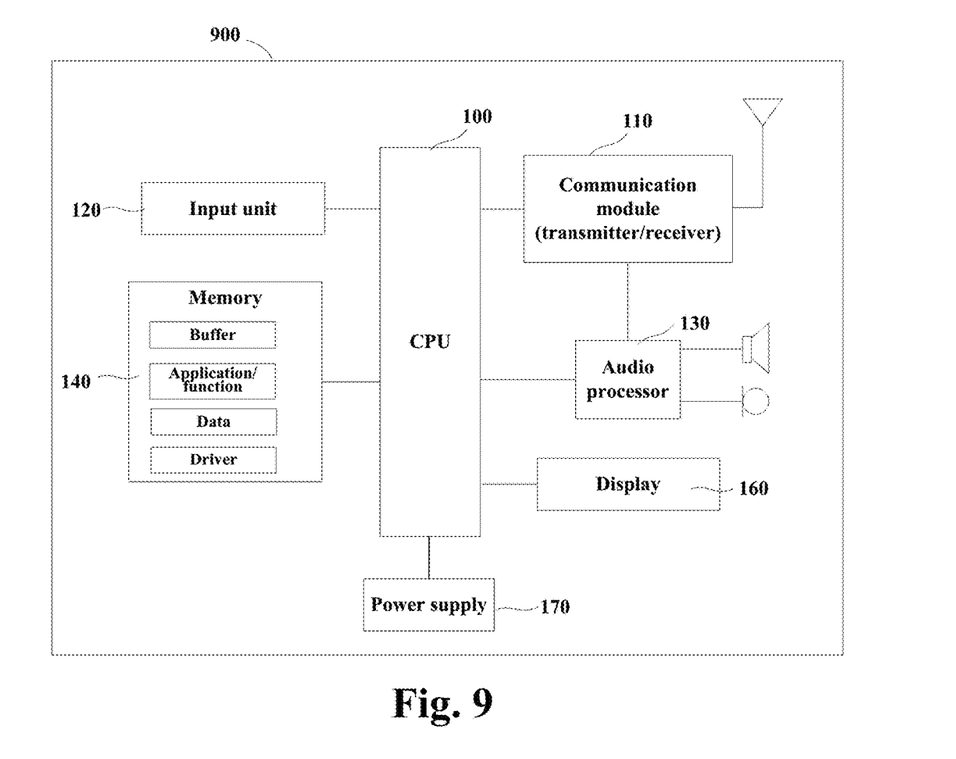
FIG. 9 is a block diagram of a systematic structure of UE of the embodiment of this disclosure.

FIG. 9 is a schematic diagram of a systematic structure of the UE of the embodiment of this disclosure. As shown in FIG. 9, the UE 900 may include a central processing unit 100 and a memory 140, the memory 140 being coupled to the central processing unit 100. It should be appreciated that this figure is illustrative only, and other types of structures may also be used, so as to supplement or replace this structure and achieve a telecommunications function or other functions.

In an implementation, the functions of the uplink configuration device 800 may be integrated into the central processing unit 100. The central processing unit 100 may be configured to carry out the method described in Embodiment 1.

In another implementation, the uplink configuration device 800 and the central processing unit 100 may be configured separately. For example, the uplink configuration device 800 may be configured as a chip connected to the central processing unit 100, with its functions being realized under control of the central processing unit 100.

As shown in FIG. 9, the UE 900 may further include a communication module 110, an input unit 120, an audio processor 130, a display 160 and a power supply 170. It should be appreciated that the UE 900 does not necessarily include all the parts shown in FIG. 9, and furthermore, the UE 900 may include parts not shown in FIG. 9, and the relevant art may be referred to.

As shown in FIG. 9, the central processing unit 100 is sometimes referred to as a controller or control element, and may include a microprocessor or other processor devices and/or logic devices. The central processing unit 100 receives input and controls operations of every components of the UE 900.

The memory 140 may be, for example, one or more of a buffer memory, a flash memory, a hard drive, a mobile medium, a volatile memory, a nonvolatile memory, or other suitable devices, which may store the above planned network information and deployed network information, and may further store a program executing related information. And the central processing unit 100 may execute the program stored in the memory 140, so as to realize information storage or processing, etc. Functions of other parts are similar to those of the relevant art, which shall not be described herein any further. The parts of the UE 900 may be realized by specific hardware, firmware, software, or any combination thereof, without departing from the scope of the present disclosure.

It can be seen from the above embodiment that the UE determines whether there exists the uplink grant of the serving cell in the licensed band when the MAC control element is triggered, and preferentially allocates the MAC control element for the uplink grant of the serving cell in the licensed band in the case where there exists the uplink grant of the serving cell in the licensed band. Hence, reliability of transmitting the MAC control element in the LAA system may be improved, and unnecessary transmission latency or failure may be lowered.

Embodiment 3

Figure 10:
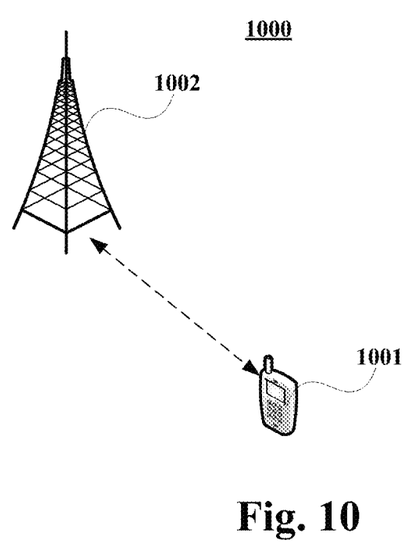
FIG. 10 is a schematic diagram of a communications system of an embodiment of this disclosure.

An embodiment of this disclosure provides a communications system. FIG. 10 is a schematic diagram of the communications system of the embodiment of this disclosure. As shown in FIG. 10, the communications system 1000 includes UE 1001 and a base station 1002.

The UE 1001 is configured to determine whether there exists an uplink grant of a serving cell in a licensed band when an MAC control element is triggered, and allocate the uplink grant of the serving cell in the licensed band for the MAC control element in a case where there exists the uplink grant of the serving cell in the licensed band and the uplink grant of the serving cell in the licensed band is capable of accommodating the MAC control element.

In this embodiment, the MAC control element may include: an MAC control element for a BSR with exception of BSRs included for padding, and/or an MAC control element for a PHR or an extended PHR.

In this embodiment, the UE 1001 may further be configured to delay transmission of the MAC control element, in a case where there exists no the uplink grant of the serving cell in the licensed band, or in a case where there exists the uplink grant of the serving cell in the licensed band but the uplink grant of the serving cell in the licensed band is incapable of accommodating the MAC control element.

In this embodiment, the UE 1001 may further be configured to determine whether there exists the uplink grant of the serving cell in the unlicensed band in a case where there exists no the uplink grant of the serving cell in the licensed band, and allocate the uplink grant of the serving cell in the unlicensed band for the MAC control element in a case where there exists the uplink grant of the serving cell in the unlicensed band and the uplink grant of the serving cell in the unlicensed band is capable of accommodating the MAC control element.

In this embodiment, the UE 1001 may further be configured to terminate a process of logical channel prioritization in a case where there exists no the uplink grant of the serving cell in the unlicensed band, or delay transmission of the MAC control element in a case where there exists the uplink grant of the serving cell in the unlicensed band but the uplink grant of the serving cell in the unlicensed band is incapable of accommodating the MAC control element.

An embodiment of the present disclosure provides a computer readable program code, which, when executed in UE, will cause a computer unit to carry out the method described in Embodiment 1 in the UE.

An embodiment of the present disclosure provides a computer readable medium, including a computer readable program code, which will cause a computer unit to carry out the method described in Embodiment 1 in UE.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A medium access control (MAC) control element uplink configuration method, comprising:
   determining, by user equipment (UE), whether there exists an uplink grant of a serving cell in a licensed band when an MAC control element is triggered;
   allocating, by the UE, at least part of a granted uplink resource of the serving cell in the licensed band for the MAC control element in a case where there exists the uplink grant of the serving cell in the licensed band and the uplink grant of the serving cell in the licensed band is capable of accommodating the MAC control element;
   determining, by the UE, whether there exists an uplink grant of a serving cell in an unlicensed band in a case where there exists no the uplink grant of the serving cell in the licensed band; and
   allocating, by the UE, at least a part of granted uplink resource of the serving cell in the unlicensed band for the MAC control element in a case where there exists the uplink grant of the serving cell in the unlicensed band and the uplink grant of the serving cell in the unlicensed band is capable of accommodating the MAC control element.

2. The method according to claim 1, wherein the MAC control element comprises:
   an MAC control element for a BSR with exception of BSRs included for padding, and/or
   an MAC control element for a PHR or an extended PHR.

3. The method according to claim 1, wherein the method further comprises:
   delaying, by the UE, transmission of the MAC control element in a case where the uplink grant of the serving cell in the licensed band is incapable of accommodating the MAC control element.

4. The method according to claim 1, wherein the method further comprises:
   delaying, by the UE, transmission of the MAC control element in a case where there exists no the uplink grant of the serving cell in the licensed band.

5. The method according to claim 1, wherein the method further comprises:
   delaying, by the UE, transmission of the MAC control element in a case where the uplink grant of the serving cell in the unlicensed band is incapable of accommodating the MAC control element.

6. The method according to claim 1, wherein the method further comprises:
   terminating, by the UE, a process of logical channel prioritization in a case where there exists no the uplink grant of the serving cell in the unlicensed band.

7. A medium access control (MAC) control element uplink configuration device, comprising:
   a memory configured to store a plurality of instructions; and
   processor circuitry coupled to the memory and configured execute the plurality of instructions to:
   determine whether there exists an uplink grant of a serving cell in a licensed band when an MAC control element is triggered; and
   allocate at least a part of a granted uplink resource the uplink grant of the serving cell in the licensed band for the MAC control element in a case where there exists uplink grant of the serving cell in the licensed band and the uplink grant of the serving cell in the licensed band is capable of accommodating the MAC control element;
   determine whether there exists an uplink grant of a serving cell in an unlicensed band in a case where there exists no the uplink grant of the serving cell in the licensed band; and
   allocate at least a part of granted uplink resource of the serving cell in the unlicensed band for the MAC control element in a case where there exists the uplink grant of the serving cell in the unlicensed band and the uplink grant of the serving cell in the unlicensed band is capable of accommodating the MAC control element.

8. The device according to claim 7, wherein the MAC control element comprises:
   an MAC control element for a BSR with exception of BSRs included for padding, and/or
   an MAC control element for a PHR or an extended PHR.

9. The device according to claim 7, wherein the processor circuitry is further configured to delay transmission of the MAC control element in a case where the uplink grant of the serving cell in the licensed band is incapable of accommodating the MAC control element.

10. The device according to claim 7, wherein the processor circuitry is further configured to delay transmission of the MAC control element in a case where there exists no the uplink grant of the serving cell in the licensed band.

11. The device according to claim 7, wherein the processor circuitry is further configured to delay transmission of the MAC control element in a case where the uplink grant of the serving cell in the unlicensed band is incapable of accommodating the MAC control element.

12. The device according to claim 7, wherein the processor circuitry is further configured to terminate a process of logical channel prioritization in a case where there exists no the uplink grant of the serving cell in the unlicensed band.

13. A communications system, comprising:
   A User Equipment (UE) configured to:
   determine whether there exists an uplink grant of a serving cell in a licensed band when a medium access control (MAC) control element is triggered, and allocate at least a part of a granted uplink resource of the serving cell in the licensed band for the MAC control element in a case where there exists the uplink grant of the serving cell in the licensed band and the uplink grant of the serving cell in the licensed band is capable of accommodating the MAC control element;
   determine whether there exists the uplink grant of the serving cell in an unlicensed band in a case where there exists no the uplink grant of the serving cell in the licensed band; and
   allocate at least a part of granted uplink resource of the serving cell in the unlicensed band for the MAC control element in a case where there exists the uplink grant of the serving cell in the unlicensed band and the uplink grant of the serving cell in the unlicensed band is capable of accommodating the MAC control element.

14. The communications system according to claim 13, wherein the MAC control element comprises:
   an MAC control element for a BSR with exception of BSRs included for padding, and/or
   an MAC control element for a PHR or an extended PHR.

15. The communications system according to claim 13, wherein the UE is configured to delay transmission of the MAC control element, in a case where there exists no uplink grant of the serving cell in the licensed band, or in a case where there exists the uplink grant of the serving cell in the licensed band but the uplink grant of the serving cell in the licensed band is incapable of accommodating the MAC control element.

16. The communications system according to claim 13, wherein the UE is configured to terminate a process of logical channel prioritization in a case where there exists no the uplink grant of the serving cell in the unlicensed band, or delay transmission of the MAC control element in a case where there exists the uplink grant of the serving cell in the unlicensed band but the uplink grant of the serving cell in the unlicensed band is incapable of accommodating the MAC control element.

* * * * *